United States Patent [19]

Fagan

[11] 3,997,133
[45] Dec. 14, 1976

[54] CRASH ATTENUATION LANDING GEAR

[75] Inventor: Castle H. Fagan, Irving, Tex.

[73] Assignee: Textron, Inc., Fort Worth, Tex.

[22] Filed: July 30, 1975

[21] Appl. No.: 600,913

[52] U.S. Cl. .......................... 244/104 R; 188/1 C; 244/100 R
[51] Int. Cl.² ........................................ B64C 25/58
[58] Field of Search ........... 244/104 R, 108, 100 R; 188/1 C, 271; 293/1, 89

[56] References Cited

UNITED STATES PATENTS

| 3,265,163 | 8/1966 | Gilbert et al. | 244/100 R X |
| 3,381,778 | 5/1968 | Von Tiesenhausen | 244/100 R X |
| 3,599,757 | 8/1971 | Takamatsu et al. | 188/1 C |

Primary Examiner—Trygve M. Blix
Assistant Examiner—Barry L. Kelmachter
Attorney, Agent, or Firm—Richards, Harris and Medlock

[57] ABSTRACT

In a landing gear for an airframe mounted on a cushioned strut, an airframe mounted portion is guided along a landing gear portion after the landing gear touches down. Crash attenuation is absorbed by a work absorbing tube secured at one end thereof to the airframe portion in an encircling relation with respect to the airframe portion. A work applying structural fitting is secured to the airframe at the other end of the work absorbing tube and is adapted to engage and work the tube as the airframe moves downward relative to the airframe portion to dissipate energy involved in arresting downward movement of the airframe. Coupling structure between the airframe and the airframe mounted portion is provided to fail at a predetermined load to permit movement of the airframe relative to the airframe portion.

5 Claims, 9 Drawing Figures

CRASH ATTENUATION LANDING GEAR

This invention relates to the attenuation of forces involved in landing an aircraft, particularly those forces generated upon high velocity impact.

Governmental agencies prescribe performance limits within which aircraft must operate in order to avoid any damage to the aircraft or injury to personnel during landing operations. For example, the Federal Aviation Authority of the United States will certify aricraft capable of landing at vertical velocities up to 8 feet per second damaging the aircraft structure in any degree.

In contrast to such relatively low vertical velocity, it has been determined that with improved landing load control personnel aboard an aircraft will survive if the vertical velocity is not more than 42 feet per second. Semicrash conditions may be generally identified as those in which the vertical velocity is lower, of the order of 20 feet per second.

In order to minimize crash damage to air craft, landing gear has heretofore been provided with cushion structures in the struts thereof. For example, in U.S. Pat. No. 3,716,208 a two-stage set of energy absorbers is provided. A first stage involves driving a piston in an oil filled cylinder to move oil through control orifices to minimize the forces applied to the airframe from the landing gear. A second stage involves actual deformation of the struts which connect the landing gear to the airframe.

In other landing gear, struts are provided in which a landing gear portion forms a piston working inside a cylinder where the cylinder is attached directly to the fuselage. Control of flow of fluids in the piston-cylinder combination serves to attenuate or control the application of acceleration forces to the airframe as the landing wheels touch down.

The present invention is particularly applicable to landing gear of the piston-cylinder type and provides an additional or further means for attenuating the forces generated upon landing with high vertical velocities. A first aim is to permit the crew to survive such a landing. A second aim is to minimize the damage to an airframe during such landing.

In accordance with the present invention, a landing gear is provided where an airframe is mounted on a cushioned strut which strut includes an airframe portion, which serves as the strut outer cylinder, which moves and is guided along an inner landing gear portion after the landing gear touches down. Crash force attenuation means is provided in the form of a work absorbing tube secured at the upper end ot the airframe in an encircling relation with respect to the airframe portion of the landing gear. A work applying structural fitting is secured to the airframe and is located and adapted such that it will engage the lower end of the tube and will work the tube should the airframe move downward relative to the airframe portion of the gear thereby bringing successive longitudinal portions of said tube into contact with said work applying structural fitting, thus to dissipate energy involved in arresting the downward movement of the airframe.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
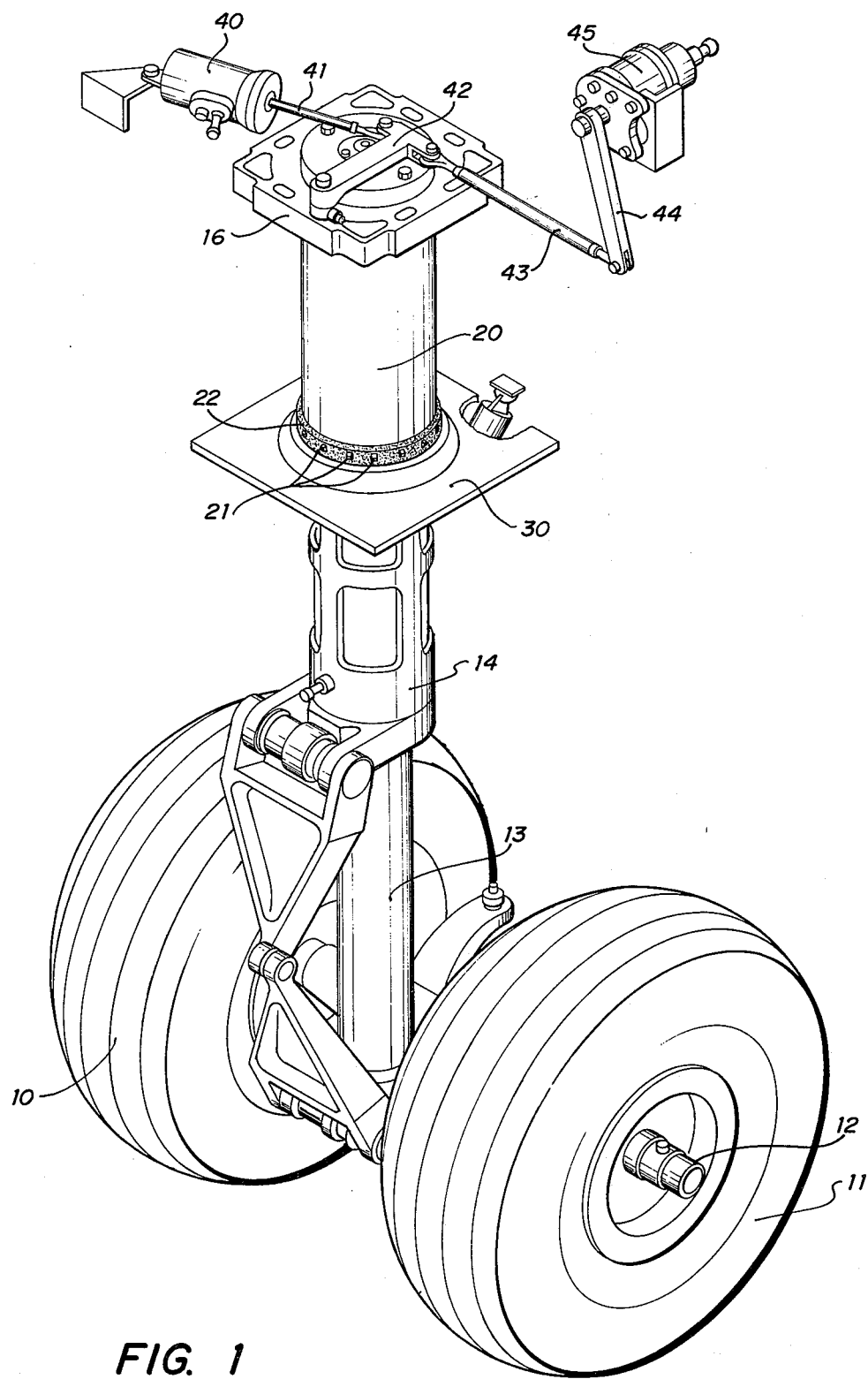
FIG. 1 is a perspective view of a nose landing gear embodying the present invention.

The present invention is applicable to helicopter landing gears as well as to fixed wing landing gears. The structure illustrated in FIGS. 1 and 2 is a representative nose landing gear assembly for a helicopter.

the landing gear assembly includes a pair of wheels 10 and 11 which are suitably mounted on an axle assembly 12. A piston 13 extends upward from the axle assembly 12 and is telescopically inserted into an outer cylinder 14. Cylinder 14 is secured to an upper bearing block assembly 15. Assembly 15 is then nested in and secured to an airframe attachment 16. Thus, as the wheels 10 and 11 touch down at landing, the weight of the airframe is imposed on the landing gear through the airframe attachment 16.

Figure 2:
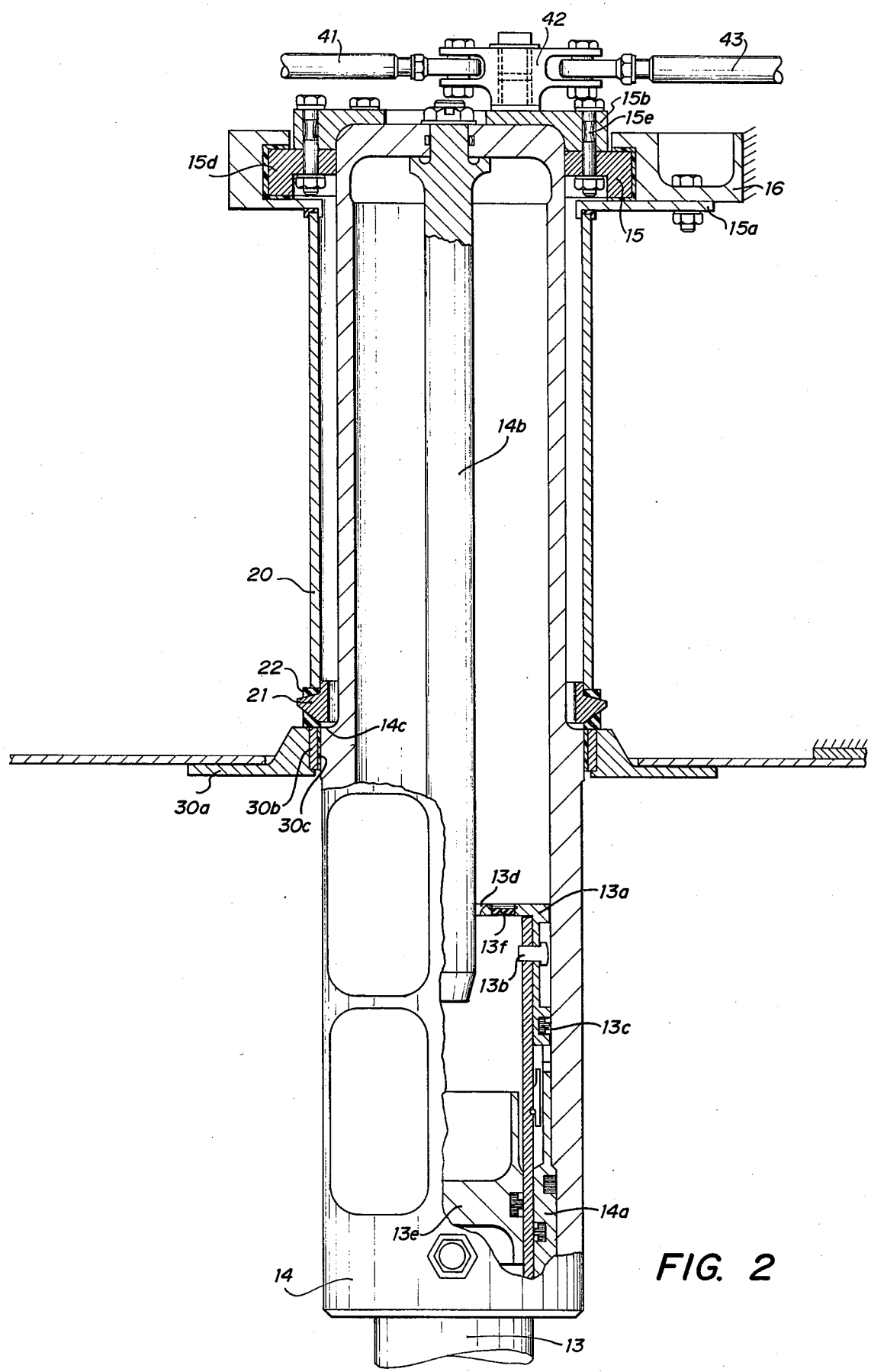
FIG. 2 is a longitudinal sectional view of the upper portion of the unit of FIG. 1.

In FIG. 2, piston 13 extends upward through the bottom of cylinder 14 through a lower bearing assembly 14a which has sealing rings which engage piston 13. The inner diameter of the cylinder 14 is substantially larger than the outer diameter of piston 13 as to receive bearing assembly 14a. A piston head 13a is fitted over the upper end of piston 13 and is secured thereto as by pins 13b. A sliding seal structure 13c is mounted in the piston head 13a and engages the inner wall of the cylinder 14. The piston head 13a has a central aperture 13d.

A floating piston 13e is mounted inside piston 13 and is adapted to move along the length thereof. The piston 13 is hollow. The portion thereof below the floating piston 13e is air filled. The portion above the floating piston 13e is oil filled. The cylinder 14 also is oil filled above the piston head 13a. A metering pin 14b is fastened to the head of cylinder 14 and to the upper bearing block 15 and extends through the orifice 13d to meter the flow of oil through the orifice 13d. Piston head 13a is provided with blow-out plugs 13f which are so mounted and constructed as to be forced out from head 13a upon the build up of a predetermined extreme pressure in the cylinder 14. As the aircraft weight is imposed on the bearing assembly 15, the cylinder 14 moves downward over piston 13. As cylinder 14 moves, oil flows through the orifice 13d. Upon development of sufficient fluid pressure (crash or semicrash conditions), plugs 13f are blown out. Thus, pressure is applied to the floating piston 13e thereby compressing the air beneath the same. The rate at which the forces are built up depends upon the rate of flow of oil through the orifice 13d and the holes opened by removal of plugs 13f. By this means the aircraft is cushioned on the air mass below the floating piston 13e and the resistance of the oil to be forced through the orifices at an extremely high rate.

The present invention provides in combination with such a cushioned strut an energy dissipation structure in the form of a thin cylinder 20. Cylinder 20 is mounted in a plate 15a forming part of the upper bearing block assembly 15. The cylinder 20 in one embodiment was relatively thin walled aluminum cylinder of well known characteristics. It was a 2024-T3 aluminum alloy extrusion. A suitable wall thickness for tube 20 is 0.146 inch.

Tube 20, secured in the plate 15a, and thus to the airframe, extends downwardly encircling the cylinder 14 to a point immediately above an exterior shoulder 14c formed about midway the length of cylinder 14. A working ring 21 is mounted as to encircle cylinder 14 immediately above shoulder 14c. Working ring 21 is molded into a rubber body 22 which serves to maintain ring 21 and tube 20 centered on cylinder 14.

Figure 3:
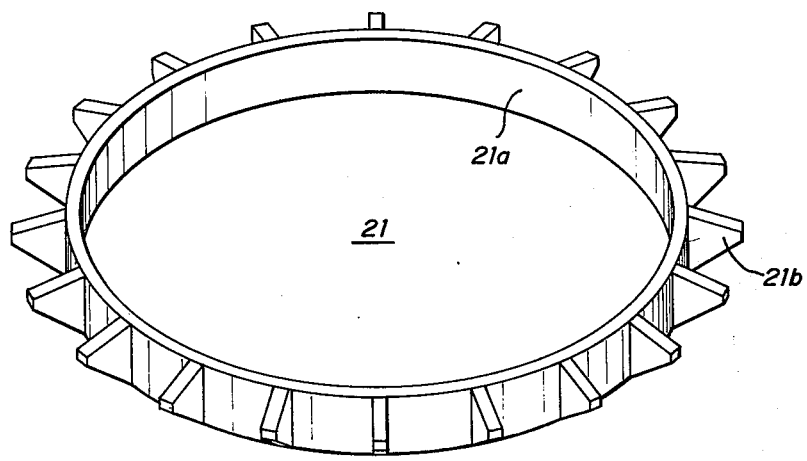
FIG. 3 illustrates the working ring from the unit of FIGS. 1 and 2.

In the embodiment illustrated herein, ring 21 was in the form of a multibladed cutting ring such as shown in FIG. 3. Thus, in FIG. 3 the ring 21 comprises a band 21a with a plurality of exterior radially extending projections 21b. In the specific embodiment here indicated, the ring was about one-half of an inch in length with the protrusions 21b extending outwardly about three-eighths of an inch. The outer diameter of band 21a was slightly smaller than the inner diameter of cylinder 20.

The function of the ring 21 is to dissipate energy by mechanically working tube 20. In the form shown where the protuberances 21b serve to cut slots in the cylinder 20 as the airframe moves tube 20 downward over cylinder 14.

It will be noted that the upper bearing block assembly 15 comprises an upper disk 15b secured by a plurality of load control bolts 15e to a mounting ring 15d. Mounting ring 15d is then secured in an annulus formed in the upper bearing block 16 to which the plate 15a is secured.

In normal operation, the bolts 15e remain intact securing plate 15b to ring 15 so that the cylinder 20 is fixed in its position relative to the working ring 21. The load control bolts 15e are machined, i.e., necked down, at a central portion. Under high landing load conditions they will fail in tension at a predetermined load. When bolts 15e fail, the plate 15b is freed from ring 15d so that the cylinder 14 may then move upward relative to the airframe through ring 15d. Ring 21 is supported by shoulder 14c causing the cutters to engage the lower end of tube 20. This causes the tube 20 to be cut longitudinally into a plurality of strips as it moves downward relative to cylinder 14. A large part of the energy to be dissipated in arresting downward travel of the airframe after the wheels touch down is thus dissipated in the work performed in cutting the plurality of slots longitudinally of the cylinder 20.

A lower bearing support 30 is provided immediately below shoulder 14c. The lower bearing support 30 comprises a ring encircling the cylinder 14 with a bearing ring 30b mounted in a plate 30a. The ring 30b is lined with a fabric impregnated with Teflon to form a thin bearing body 30c. The aircraft skin is secured to plate 30a. When bolts 15e fail and cylinder 14 moves relative to the upper bearing block assembly 15, the cylinder 14 slides upward through the bearing ring 30c.

Figure 4:
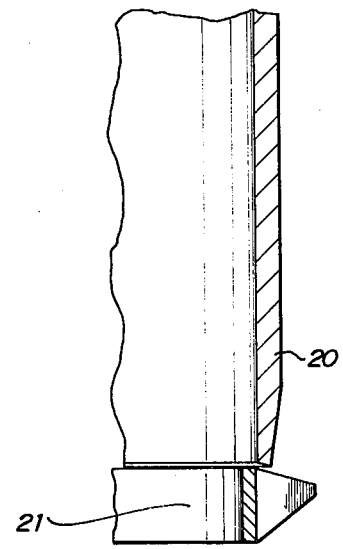
FIG. 4 illustrates one form of the lower end of the cutter tube of FIGS. 1 and 2.

In FIG. 4, the lower end of the cylinder 20 has been illustrated to show one form in which the cylinder has been employed. The lower end 20a is tapered on the outside and inwardly beveled on the bottom to facilitate starting and to prevent the application of a peak load at the beginning of the traverse of the cutting ring 21 through the cylinder.

It will be recognized that the cylinder 14 may rotate without limitation relative to the airframe attachment 16. That is, the upper bearing block 15 may rotate in the annulus in which it is mounted in response to steering on the aircraft.

While not directly a part of this invention, there is illustrated a centering cylinder 40 coupled by way of a rod 41 to a cam linkage 42 which serves to normally maintain the wheels 10 and 11 aligned with the fore/aft axis of the aircraft. The cylinder 40 is a resilient air cushion cylinder that operates through linkage 42 and a suitable cam to maintain the center relationship.

Further, a linkage including rod 43 and crank arm 44 leads to a damper cylinder 45 to minimize vibration or wobble of the landing gear during landing operations.

Figure 5:
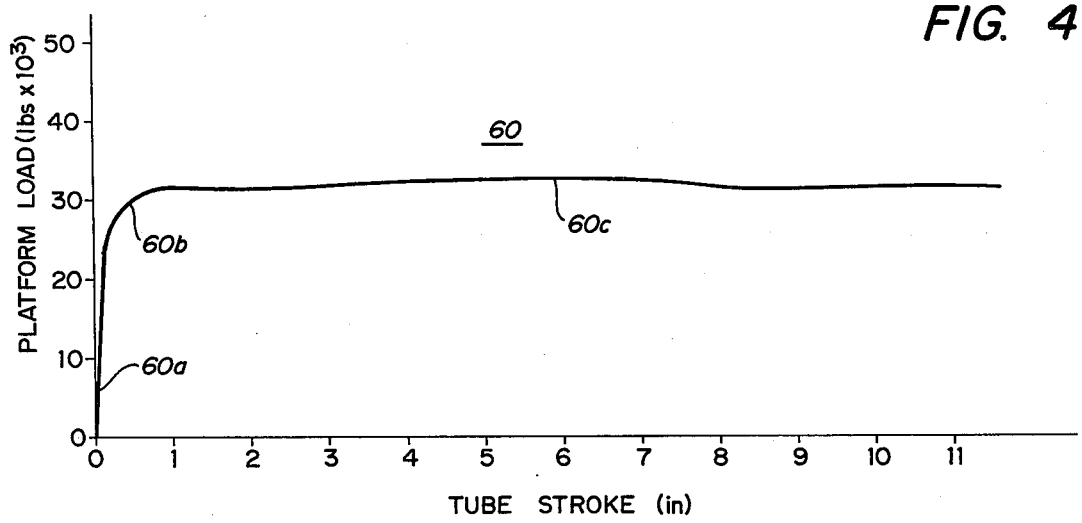
FIG. 5 is a graph illustrating performance of the unit of FIGS. 1-4.

FIG. 5 illustrates the load variation achieved through use of the present invention. FIG. 5 is a graph in which load is plotted as ordinates in terms of thousands of pounds. This represents the force exerted by wheels 10 and 11 on the earth after touch down during a crash landing. The abscissa are identified in terms of the stroke or travel of tube 20 downward past the cutter ring 21 and travel of the piston 13 relative to cylinder 14. Curve 60 is comprised of three separate segments. The segment 60a represents the initial portion of the travel of the piston 13 relative to cylinder 14 during buildup of the load as fluid is forced through orifice 13d. It is during this portion that pressure of the oil builds up in the upper cylinder 14 and, at the end of portion 60a, bolts 15e fail and blow-out plugs 13f are extruded from piston head 13a.

The transition portion 60b represents the beginning of working of the cutters 21 at the bottom of tube 20. The linear portion 60c represents the constant load maintained by cutters 21 traveling upward through tube 20 and during travel of piston 13 relative to cylinder 14. The cutter blades each plow a path the width of each blade linearly upward through the tube 20 which in this configuration is about 10 inches long. This results in the tube being reduced to a set of aluminum strips each strip being the width of the space between the blades on ring 21. The strips tend to curl upward as the stroke of the cylinder 20 moves downward over the cutter 21.

The significance of the linear portion 60c of curve 60 lies in the fact that over substantially the entire length of the stroke of cylinders 20 and 13 the load is constant, thus absorbing the landing energy efficiently from aircraft touch down until the fuselage contacts the earth.

It is to be noted that the values represented by curve 69 were obtained from test and calculated data using a system having tube-cutter structure shown in FIG. 1 with a total weight of 3460 pounds to be applied thereto. The wall of tube 20 was 0.146 inch thick. The lower end of the tube was tapered as shown in FIG. 4. The cutter 21 had 16 blades. During a cuttertube test the weight was dropped from 27 feet 3 inches having an impact velocity of 41.2 ft./sec. and a final velocity of 34.79 ft./sec. with a total tube 20 travel of 11.6 inches. The linear portion 60c is highly desirable. Achievement of such a load characteristic with so little additional weight and with elements so simply constructed represents a significant contribution to the art.

Figure 6:
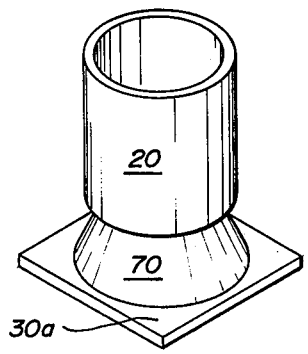
FIGS. 6 and 7 illustrate a modified form of work applying structures.

FIG. 6 illustrates a modification of the work units in which the tube is caused to be flared. More particularly, tube 20 is mounted so that the lower end thereof confronts a flaring structure 70 mounted on cylinder 14 (not shown) immediately above plate 30a.

Figure 7:
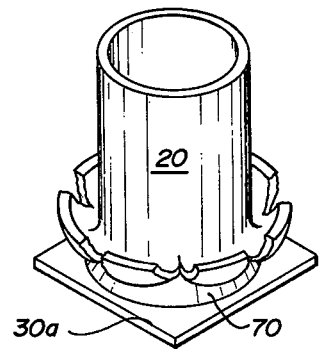

As shown in FIG. 7, as tube 20 is forced downward over the working surface 70, the edges are flared outward and the tube is torn. The flaring operation involves the absorption of energy and thus attenuates the forces applied to the airframe.

Figure 8:
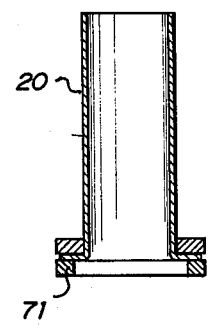
FIGS. 8 and 9 illustrate a further modification of the present invention.

In FIG. 8, a modified form of absorber is shown wherein tube 20 has the lower end thereof flared outwardly and mounted in a clamping ring 71. The upper end of tube 20 is to be secured to the attachment structure 16 of FIG. 2.

Figure 9:
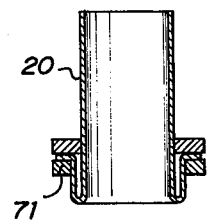

In FIG. 9, as the tube 20 is driven downward relative to the fixture 71, tube 20 is turned inside out with the operation to accomplish this involving the absorption of energy. It will further be appreciated that structure could be employed to turn such a tube outside in, substantially reversing the operation shown in FIGS. 8 and 9.

It will be understood from the foregoing description that the preferred embodiment of the invention involves the use of the cutter ring 21 which slices tube 20 into strips during the extreme landing conditions.

Thus, in accordance with the invention, the work absorbing tube 20 is secured at one end thereof to the airframe in an encircling relation with respect to a landing gear cylinder. A work applying structure involving the ring 21 is secured at the other end of the tube such that motion of the landing gear structure causes the tube 20 to engage ring 21 and as the airframe portion moves downward along the landing gear to dissipate energy involved in arresting downward movement of the airframe.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a landing gear where an airframe is mounted on a cushioned strut including an airframe mounted portion guided along a landing gear portion after said landing gear touches down, crash attenuation means comprising:
    a. a work absorbing tube secured at one end thereof to said airframe mounted portion in an encircling relation with repsect to said airframe mounted portion, and
    b. a work applying structural fitting secured to said airframe at the other end of the work absorbing tube adapted to engage and work said tube as said airframe moves downward relative to said airframe mounted portion to dissipate energy involved in arresting downward movement of said airframe including coupling structure between said airframe and said airframe mounted portion which is provided to fail at a predetermined load to permit movement of said airframe relative to said airframe mounted portion.

2. A landing gear system for placing in series with an air cushion a solid work piece for absorption of energy upon high impact landing of an airframe which comprises:
    a. a landing gear including a strut formed of a lower piston working inside an upper cylinder with oil filled and air filled variable volume compartments therein for developing an air cushion in the air filled compartment and differential oil pressures across the head of said piston upon downward movement of said cylinder relative to said piston,
    b. fastening means connecting said cylinder to said airframe and structured to fail at a predetermined load applied through said fastening means to said cylinder,
    c. guide means through which said upper cylinder moves upon failure of said fastening means,
    d. an absorption tube secured to said airframe adjacent the upper end of said cylinder and encompassing at least the upper portion of said cylinder, and
    e. structure carried by said cylinder adjacent the lower end of said absorption tube for engaging said lower end to mechanically work said tube upon downward movement of said airframe relative to said upper cylinder.

3. The combination set forth in claim 2 in which said cylinder has an up facing shoulder at a point below the lower end of said absorption tube and wherein a working ring is mounted on said shoulder and adapted to engage said absorption tube to work said absorption tube as said airframe moves downward relative to said cylinder.

4. The combination set forth in claim 3 in which said working ring comprises a plurality of radial up facing cutter blades which are adapted to slice said absorption tube into longitudinal strips as said airframe moves downward relative to said cylinder.

5. The combination set forth in claim 2 in which a load bearing assembly is secured to said airframe at a point normally positioned immediately below said structure and is adapted to guide said airframe downward over said cylinder during working of said absorption tube.

* * * * *